(12) United States Patent
Stein et al.

(10) Patent No.: US 12,424,376 B2
(45) Date of Patent: Sep. 23, 2025

(54) HIGH EFFICIENCY WIRELESS POWER TRANSFER COILS

(71) Applicant: Resonant Link, Inc., South Burlington, VT (US)

(72) Inventors: Aaron Stein, Essex, VT (US); Phyo Aung Kyaw, Winooski, VT (US); Panteleimon Papamanolis, Zurich (CH)

(73) Assignee: Resonant Link, Inc., South Burlington, VT (US)

( * ) Notice: Subject to any disclaimer, the term of this patent is extended or adjusted under 35 U.S.C. 154(b) by 0 days.

(21) Appl. No.: 18/534,930

(22) Filed: Dec. 11, 2023

(65) Prior Publication Data

US 2024/0234008 A1 Jul. 11, 2024

Related U.S. Application Data

(63) Continuation of application No. PCT/US2022/032361, filed on Jun. 6, 2022.

(60) Provisional application No. 63/211,403, filed on Jun. 16, 2021.

(51) Int. Cl.
*H01F 27/28* (2006.01)
*H02J 50/00* (2016.01)
*H02J 50/10* (2016.01)

(52) U.S. Cl.
CPC ........ *H01F 27/2804* (2013.01); *H02J 50/005* (2020.01); *H02J 50/10* (2016.02)

(58) Field of Classification Search
CPC ...... H01F 27/2804; H01F 27/40; H01F 38/14; H02J 50/005; H02J 50/10; H02J 50/402

USPC .......................................................... 307/104
See application file for complete search history.

(56) References Cited

U.S. PATENT DOCUMENTS

| | | | |
|---|---|---|---|
| 7,622,891 B2 | 11/2009 | Cheng et al. | |
| 7,789,993 B2 * | 9/2010 | Chen ..................... | H01J 37/321 |
| | | | 118/723 AN |
| 8,058,593 B2 * | 11/2011 | Weber .................. | G01R 33/288 |
| | | | 623/1.1 |
| 9,859,052 B2 * | 1/2018 | Kurz .................... | H01F 27/2852 |
| 10,998,124 B2 * | 5/2021 | Foley .................. | H01F 27/2852 |
| 2008/0185284 A1 | 8/2008 | Chen et al. | |
| 2009/0319025 A1 | 12/2009 | Weber | |
| 2014/0340031 A1 | 11/2014 | Mi et al. | |
| 2015/0145634 A1 | 5/2015 | Kurz et al. | |

(Continued)

FOREIGN PATENT DOCUMENTS

CN 109036803 A 12/2018
CN 109461571 A 3/2019
(Continued)

OTHER PUBLICATIONS

International Search Report and Written Opinion for International Application No. PCT/US2022/032361 mailed Sep. 15, 2022.

(Continued)

*Primary Examiner* — Hal Kaplan
(74) *Attorney, Agent, or Firm* — Sunstein LLP

(57) ABSTRACT

A wireless power transfer coil circuit includes two or more current paths. The two or more current paths include a first current path having a first conductive spiral trace and a second current path having a second conductive spiral trace nested with the first conductive spiral trace.

18 Claims, 11 Drawing Sheets

(56) References Cited

U.S. PATENT DOCUMENTS

| | | | |
|---|---|---|---|
| 2017/0069422 A1 | 3/2017 | Wang et al. |
| 2017/0323718 A1 | 11/2017 | Foley |
| 2017/0324281 A1 | 11/2017 | Che |
| 2019/0304670 A1 | 10/2019 | Chiyo |
| 2020/0052528 A1 | 2/2020 | Wambugu Ngahu |
| 2020/0098514 A1 | 3/2020 | Ngahu |
| 2020/0168393 A1 | 5/2020 | Long et al. |
| 2020/0274392 A1 | 8/2020 | Chiyo et al. |
| 2022/0246349 A1 | 8/2022 | Stein et al. |
| 2023/0253147 A1 | 8/2023 | Kyaw et al. |

FOREIGN PATENT DOCUMENTS

| | | |
|---|---|---|
| CN | 109801778 A | 5/2019 |
| CN | 112735770 A | 4/2021 |
| GB | 2533695 A | 6/2016 |
| WO | WO 2019/173579 A1 | 9/2019 |

OTHER PUBLICATIONS

International Preliminary Report on Patentability for International Application No. PCT/US2022/032361 mailed Dec. 28, 2023.
Kyaw, Phyo Aung et al., "High-Q Resonator with Integrated Capacitance for Resonance Power Conversion," IEEE Applied Power Electronics Conference, Mar. 2017, pp. 2519-2526.
Extended European Search Report dated Mar. 17, 2025 in connection with European Application No. 22825543.6.

* cited by examiner

HIGH EFFICIENCY WIRELESS POWER TRANSFER COILS

RELATED APPLICATIONS

This application is a Continuation of International Patent Application Serial No. PCT/US2022/032361, filed Jun. 6, 2022, which claims the benefit under 35 U.S.C. § 119(e) of the filing date of U.S. Provisional Application Ser. No. 63/211,403, filed Jun. 16, 2021, each of which is incorporated herein by reference in its entirety.

BACKGROUND

1. Technical Field

The apparatus and techniques described herein relate to coils and particularly to wireless power transfer coils.

2. Discussion of the Related Art

Wireless charging is widely used for charging mobile devices such as smartphones. A number of wireless charging specifications have been proposed. The most widely adopted to date is the Qi specification, which operates at a frequency of 87-205 kHz.

SUMMARY

Some aspects relate to a wireless power transfer coil circuit, comprising two or more current paths including a first current path having a first conductive spiral trace and a second current path having a second conductive spiral trace nested with the first conductive spiral trace.

The first and second conductive spiral traces may be formed in a same layer.

The layer may be planar.

The first and second current paths may be connected in parallel.

The first current path may further comprise a first passive component in series with the first conductive spiral trace and the second current path may further comprise a second passive component in series with the second conductive spiral trace.

The first passive component may comprise a first capacitor and the second passive component may comprise a second capacitor.

The first passive component may comprise a first resistor and the second passive component may comprise a second resistor.

The first passive component may comprise a first capacitor and the second passive component may comprise a second capacitor.

The first current path and the second current path may comprise respective resistances selected to equalize current flow in the first and second current paths.

The respective resistances may be resistances of the respective first and second conductive spiral traces and/or resistances of resistors in series with the respective first and second conductive spiral traces.

The wireless power transfer coil circuit may further comprise a third conductive spiral trace nested with the first and second conductive spiral traces and in a same layer as the first and second conductive spiral traces.

The wireless power transfer coil circuit may further comprise a third conductive spiral trace; and a fourth conductive spiral trace nested with the third conductive spiral trace, wherein the first and second conductive spiral traces are in a first layer and the third and fourth conductive spiral traces are in a second layer different from the first layer.

The first and second layers may be separated by a dielectric layer.

Two or more of the first, second, third and fourth conductive spiral traces may be connected in parallel.

The first conductive spiral trace may be nested within the second conductive spiral trace, the third conductive spiral trace may be nested within the fourth conductive spiral trace, and the first conductive spiral trace may be connected in series with the fourth conductive spiral trace.

The wireless power transfer coil circuit may further comprise at least one conductive connection between the first and second layers within an inner diameter of the wireless power transfer coil circuit.

The wireless power transfer coil circuit may further comprise a plurality of leads extending from the first and second layers from an outer diameter of the wireless power transfer coil circuit.

The first conductive spiral trace may comprise a first segment and a second segment, and the first current path may further comprise a capacitor connected in series between the first segment and the second segment.

A width of the first conductive spiral trace may be less than three times a skin depth at a frequency of operation or a minimum frequency of operation.

Some aspects relate to a method of operating a wireless power transfer coil circuit, comprising transmitting or receiving power wirelessly through a wireless power transfer coil circuit comprising two or more current paths including a first current path having a first conductive spiral trace and a second current path having a second conductive spiral trace nested with the first conductive spiral trace.

Some aspects relate to a method of forming a wireless power transfer coil circuit, the method comprising forming two or more current paths including a first current path having a first conductive spiral trace and a second current path having a second conductive spiral trace nested with the first conductive spiral trace.

The foregoing summary is provided by way of example and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1A:
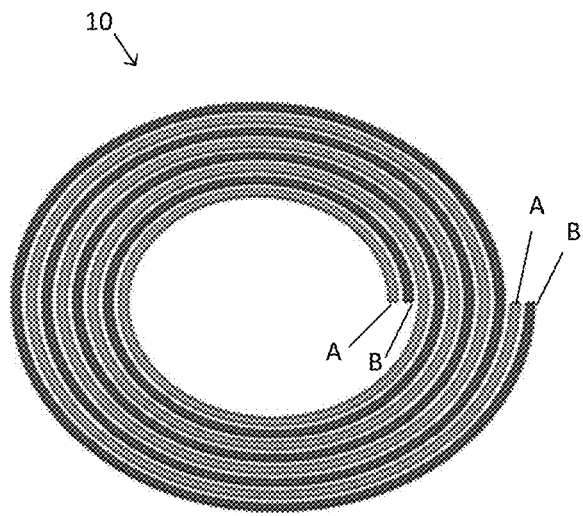
FIG. 1A shows a top view of an example of a coil with two nested spiral traces.

In wireless charging, a wireless power transmitter generates an alternating current in a wireless power transmit coil, which induces a current in a wireless power receive coil by electromagnetic induction. The term "wireless power transfer coil" refers herein to either a wireless power receive coil or a wireless power transmit coil, and to coils that may perform the function of wireless power reception or transmission (e.g., in different modes).

Many smartphones now include a built-in wireless power receiver including a wireless power receive coil and suitable electronics. For example, the electronics may include a rectifier for rectifying the alternating current induced in the receive coil into direct current, and circuitry for controlling the current provided to the battery of the smartphone during charging. In some smartphones, the receive coil can also perform the function of a wireless power transmit coil when the smartphone is controlled to be in a transmit mode, so that the smartphone can charge another smartphone.

The inventors have recognized and appreciated that existing wireless power transfer coils provide limited efficiency. In particular, existing wireless power transfer coils may have relatively wide traces, where the width of a trace is greater than the electromagnetic skin depth at the wireless power transmit frequency (frequency of operation). Accordingly, the quality factor Q of existing wireless power transfer coils may be limited to no more than about 20. As used herein, the quality factor (Q) refers to the unloaded quality factor of a wireless power transfer coil.

In some embodiments, a wireless power transfer coil may include two or more nested spiral conductors, also referred to herein as "traces," "conductive spiral traces," "spiral traces" and the like, though the conductors are not limited to a trace per se. The two or more conductive spiral traces may be approximately planar. They may be formed in the same layer of a printed circuit board or other substrate.

Individual spiral traces may have a width narrower than that of a conventional wireless power receive coil. By reducing the width of the conductive spiral traces, the power lost due to eddy currents is reduced, resulting in increased efficiency and increased Q. The traces may all have the same width or may have different widths, as the techniques and apparatus described herein are not limited in this respect. In some embodiments, the width of a trace may be less than 1 mm, less than 800 microns, less than 500 microns, or less than 250 microns. In some embodiments, the width of a trace may be less than three times the skin depth at the frequency of operation. In some embodiments, the width of a trace may be less than three times the skin depth at the minimum frequency of operation (e.g., 87 kHz for the Qi specification). In some embodiments, the height of the spiral traces may be less than 300 microns, such as 250-300 microns, which may provide a low profile suitable for integration into a smartphone or other device having a thin cavity for a wireless power transfer coil. However, the techniques and structures described herein are not limited to particular applications or particular dimensions.

In some embodiments, a wireless power transfer coil may be formed in a single layer of a printed circuit board (PCB) or two or more layers of a printed circuit board (PCB). In some embodiments, a wireless power transfer coil may be formed in a single layer of electrode layers or two or more layers of electrode layers in multilayer ceramic capacitor (MLCC) processes or low-temperature co-fired ceramic (LTCC) processes. However, the techniques and structures described herein are not limited to forming coils in layers of a PCB or electrode layers in MLCC or LTCC processes. In some embodiments, wireless power transfer coils may be formed of wire. There may be one or more layers of wire, each layer including conductive spiral traces formed of wire, which may be any type of wire, some examples of which include solid material, wire, magnet wire, stranded wire, and litz wire.

FIG. 1A shows a top view of an example of a wireless power transfer coil circuit having a coil 10 with two nested spiral traces A and B. Spiral trace A is the inner spiral trace, running alongside the outer spiral trace B. In this example, each spiral trace has four turns. However, this is an example, and each spiral trace may have any number of two or more turns. Further, although coil 10 is shown to include two nested spiral traces A and B, any number of two or more spiral traces may be nested.

Figure 1B:
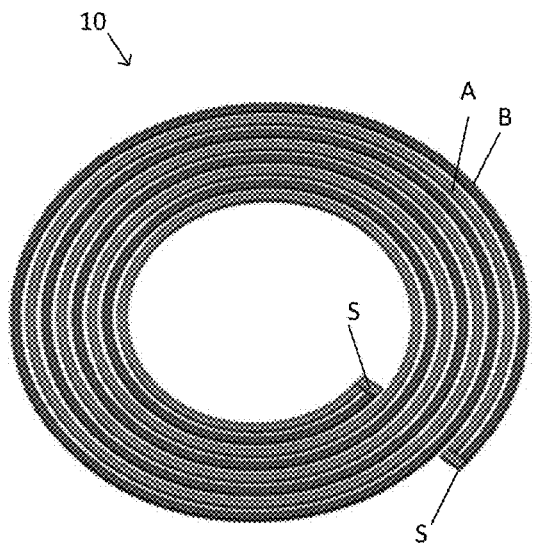
FIG. 1B illustrates a coil with shorting conductors galvanically connecting the traces A and B at their inner ends and their outer ends.

The two or more conductive spiral traces may be connected in parallel, in series, or in a combination of series and parallel. The two or more traces may be electrically insulated from one another along their length, with the exception of any point(s) at which they are coupled to one another (e.g., to make serial or parallel connections). In this example, the two spiral traces A and B are electrically insulated from each other along their length, though their ends may be connected together in parallel as shown in FIG. 1B. FIG. 1B illustrates coil 10 with shorting conductors S galvanically connecting the traces A and B at their inner ends and their outer ends.

Figure 2:
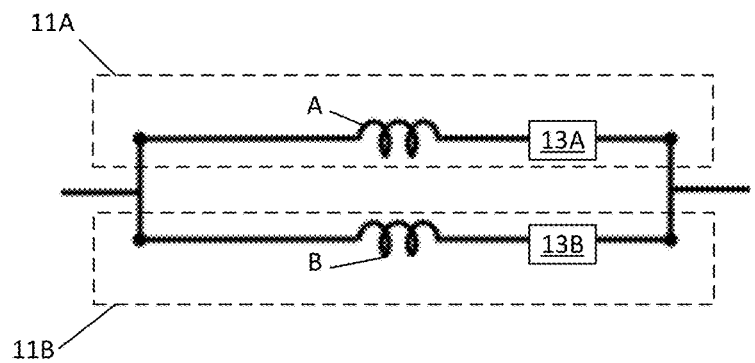
FIG. 2 shows a circuit model of the coil of FIG. 1B.

FIG. 2 shows a circuit model of the nested spiral traces of FIG. 1B. FIG. 2 shows two current paths 11A, 11B coupled in parallel. In the example of FIG. 2, each current path 11A, 11B, includes a trace A or B (represented by an inductor), respectively. Optionally, a passive component 13A, 13B may be included in a current path, in series with a trace. The passive component may be a capacitor and/or a resistor. If the passive component is a capacitor, the capacitor may act as a matching network to compensate for the inductive impedance of each conductive spiral trace. The value of the capacitor in each current path may be the same, which may provide equal current sharing between the current paths, as the impedance of the capacitor may be much larger than that provided by the trace inductance. In some embodiments, no capacitors are needed, particularly if the number of turns of each spiral is greater than four. If a capacitor is included, the value of the capacitor(s) may be selected to help equalize the current between branches. In some embodiments, the equivalent series resistance (ESR) of a trace or an optional series resistor in a current path may to help equalize the current between branches.

Figure 3:
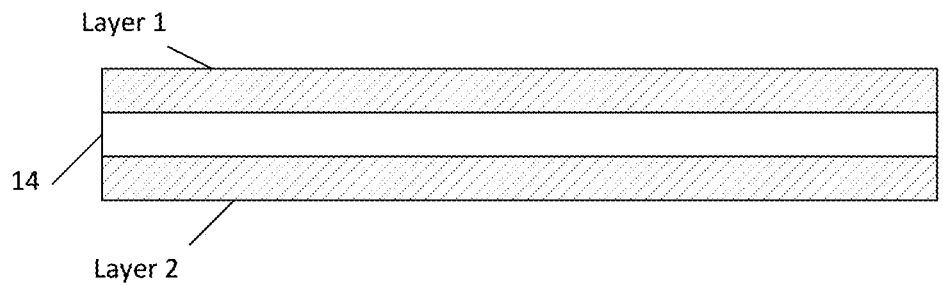
FIG. 3 shows a cross section of an example of a wireless power transfer coil with two layers, in which a first layer may have a plurality of nested spiral traces, and a second layer may have a plurality of nested spiral traces.

In some embodiments, a wireless power transfer coil may have more than one layer of nested spiral traces. FIG. 3 shows a cross section of an example of a coil with two layers, in which a first layer (Layer 1) may have a plurality of nested spiral traces, and a second layer (Layer 2) may have a plurality of nested spiral traces. The two layers of traces may be separated by a dielectric layer 14. Dielectric layer 14 may electrically insulate the traces in respective layers from one another. The layers may be separated by any electrically non-conductive material (dielectric material) or combination of materials, including but not limited to one or more of air, FR4, PLA, ABS, polyimide, PTFE, polypropylene, a mix of PTFE and supporting materials for ease of handling (e.g. Rogers Substrates, Gore Materials, or Taconic TLY materials), plastic, glass, alumina, ceramic, dielectric or ceramic layers in multilayer ceramic capacitor (MLCC) processes, or dielectric or ceramic layers in low-temperature co-fired ceramic (LTCC) processes.

Although not shown in FIG. 3, the traces in Layer 1 and Layer 2 may be electrically connected by one or more conductive connections (e.g., vias) extending between Layer 1 and Layer 2.

Figure 4A:
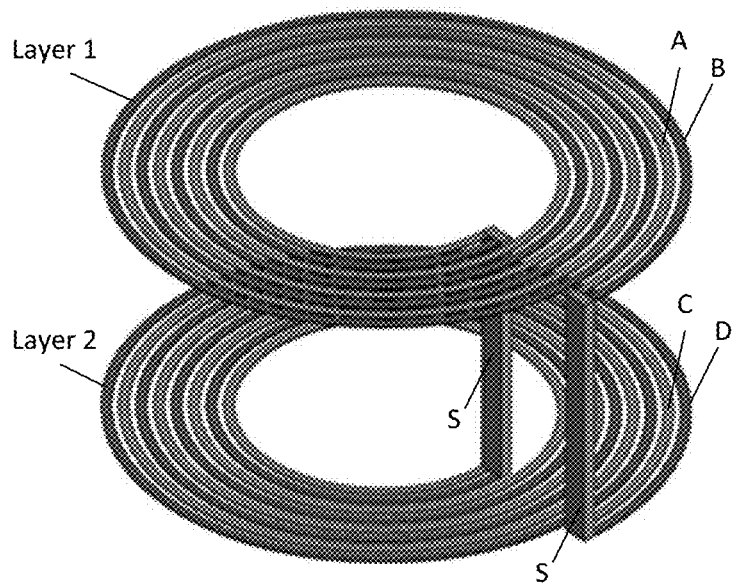
FIG. 4A illustrates an example of a wireless power transfer coil with conductive spiral traces in two layers connected in parallel.
Figure 4B:
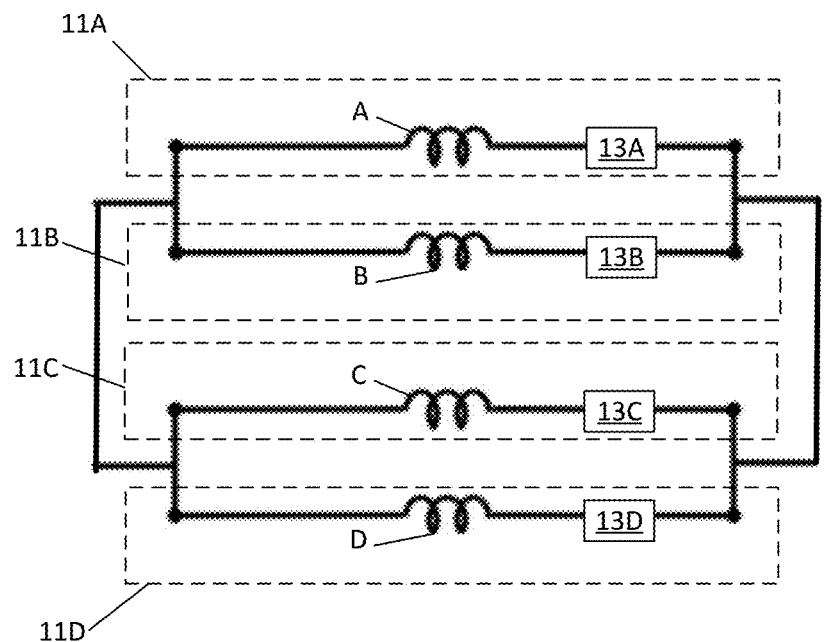
FIG. 4B shows a circuit model of the wireless power transfer coil of FIG. 4A.

In some embodiments, the nested spiral traces of different layers may be connected in parallel or in series with the nested spiral traces of one or more other layers. FIG. 4A illustrates an example of a wireless power transfer coil in which Layer 1 has two nested spiral traces A and B connected in parallel with one another in Layer 1, Layer 2 has two nested spiral traces C and D connected in parallel with one another, and conductive connections S also connect the spiral traces of Layer 1 and Layer 2, such that all four spiral traces A-D are connected in parallel. FIG. 4B shows a circuit model of the wireless power transfer coil of FIG. 4A, illustrating four parallel current paths 11A-11D which optionally may include passive components 13A-D, connected in series with the individual traces A-D.

Figure 4C:
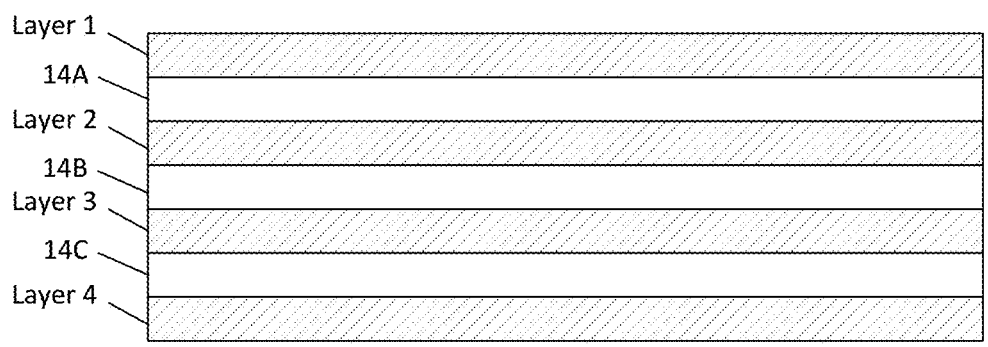
FIG. 4C illustrates four layers of traces separated by respective dielectric layers.

Although the example of FIG. 4A has four traces connected in parallel, the techniques described herein are not limited in this respect, as other configurations may connect one or more traces in series. Further, the number of layers is not limited to two, as conductive spiral traces may be formed in more than two layers, such as three layers, four layers or more, as mentioned above. In some embodiments, a wireless power transfer coil may include more than two layers of traces (e.g., three layers, or four layers, or more). Each layer of traces may be separated from the adjacent layer of traces by a dielectric layer that electrically insulates the layers from one another. For example, FIG. 4C illustrates four layers of traces (Layer1-Layer4) separated by respective dielectric layers 14A-14C. Each layer may include one or more spiral traces. For example, each layer may include two or more nested spiral traces. The traces in respective layers may all be connected to one another in parallel current paths, in series, or in another configuration.

The inventors have recognized and appreciated that when traces in different layers are in series with one another, interleaving connections between spiral traces in different layers may help to equalize the impedance of respective current paths, which may help to reduce or eliminate the need for passive components in series with respective traces. Since an outer trace in each layer (e.g., trace B of FIG. 1A) is longer than an inner trace of each layer (e.g., trace A FIG. 1A) and current crowds in the inner trace(s), the outer traces may have a different impedance than that of the inner traces. Connecting an inner trace of one layer in series with an outer trace of another layer may help to equalize the impedance of respective current paths.

Figure 4D:
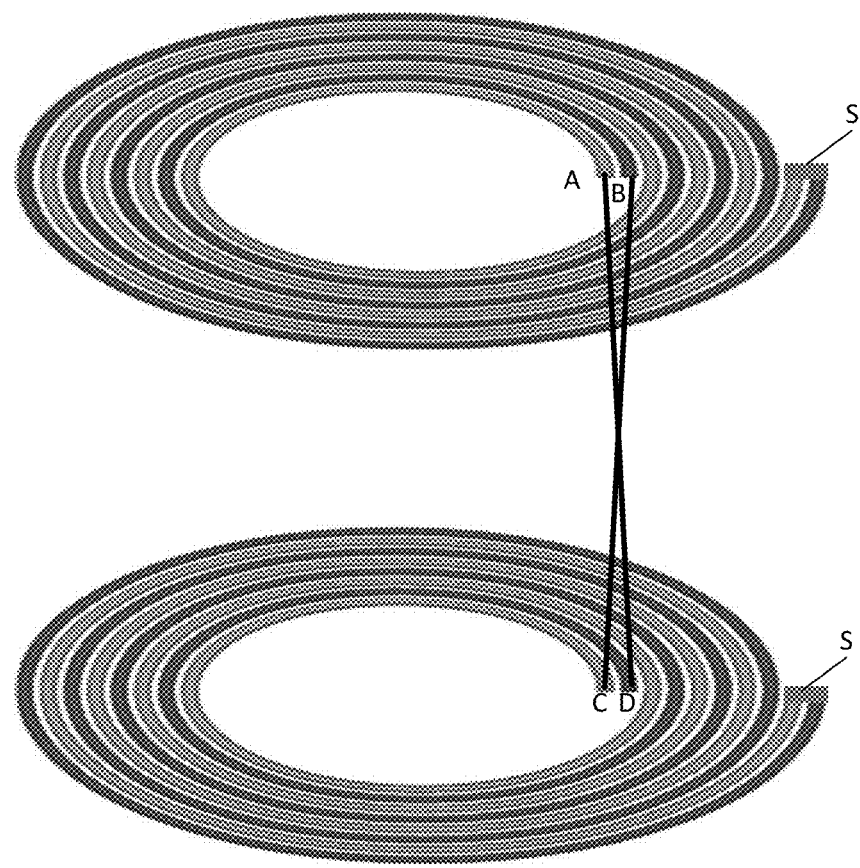
FIG. 4D shows an example in which an inner trace in a first layer is connected in series with outer trace of a second layer, and outer trace of the first layer is connected in series with inner trace of the second layer.
Figure 4E:
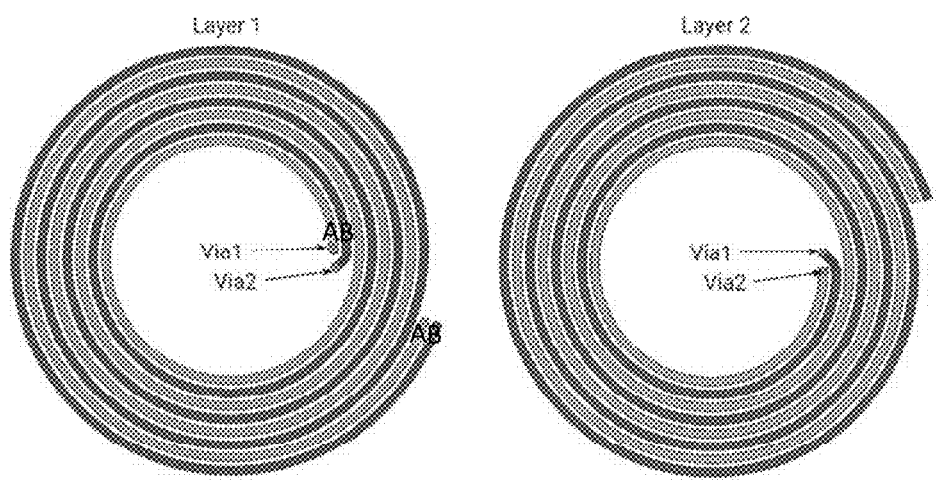
FIG. 4E illustrates one implementation of connecting the traces in different layers through vias.
Figure 4F:
FIG. 4F illustrates a circuit diagram of the structure of FIG. 4D.

FIG. 4D shows an example in which inner trace A in a first layer is connected in series with outer trace D of a second layer, and outer trace B of the first layer is connected in series with inner trace C of the second layer. FIG. 4E illustrates one implementation of connecting the traces in different layers through vias. FIG. 4F illustrates a circuit diagram of the structure of FIG. 4D. By connecting traces A and D in series and traces B and C in series, the combined series of impedance of the respective current paths may be made more equal, and in some cases may be made approximately equal. In this example, the impedance of the current path including traces A and D is $X_A+X_D$, and is approximately equal to the impedance of the current path including traces B and C, which is $X_B+X_C$. In this context, "approximately equal" may be within 30%, such as within 20%, within 10%, within 5% or within 1%.

This principle may be applied to coils having traces formed in any number of two or more layers, with two or more nested spiral traces in each layer. Conductive spiral traces in one layer may be connected in series, respectively, with conductive spiral traces in another layer at different radial positions. As a result, the combined series impedance of the conductive spiral traces in one current path may be made, more equal to, or approximately equal to, the combined series impedance of the conductive spiral traces in another current path.

As another example, in a coil with more than two layers of conductive spiral traces, the connections to conductive spiral traces at different radial positions may be interleaved. For example, with reference to FIG. 1A, the "A" trace of a first layer may be connected in series with the "B" trace of a second layer, which may be in series with the "A" trace of a third layer, etc. Alternatively, the "A" traces of a plurality of layers may be connected in series with each other, and connected in series with a plurality of "B" traces of other layers that are connected in series with each other. Many permutations of series connections can be used to produce series paths of conductive spiral traces with more equal or approximately equal impedances.

Figure 4G:
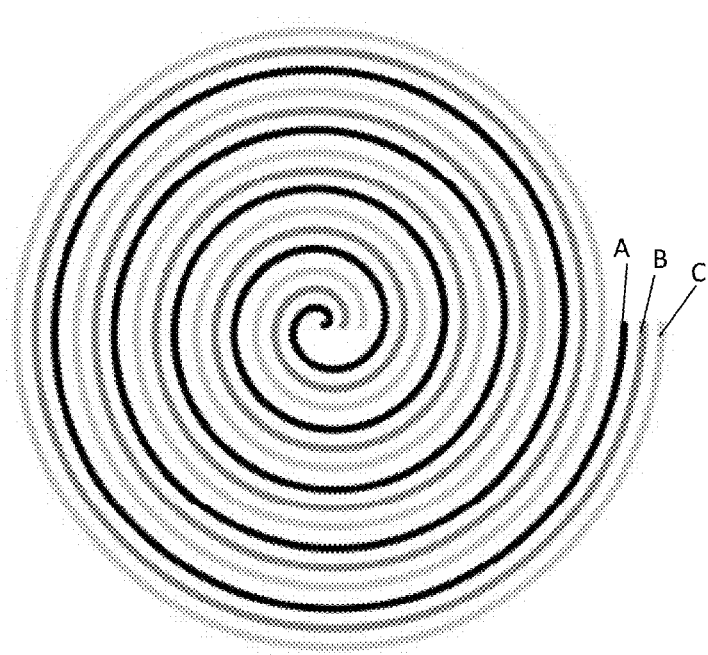
FIG. 4G shows an example of a coil with three nested conductive spiral traces.

In some embodiments, more than two nested conductive spiral traces may be formed in a layer. FIG. 4G shows an example of a layer with three nested conductive spiral traces, labeled A, B and C. For a coil having a plurality of layers of three nested spiral traces, with conductors in respective layers being connected in series, the impedances of the series current paths may be made more equal, or approximately equal, by connecting the "A" trace of one layer in series with the "C" trace of another layer, for example. Many different permutations of numbers of layers, number of nested spiral traces in each layer and/or interleaving patters may be used.

Figure 5A:
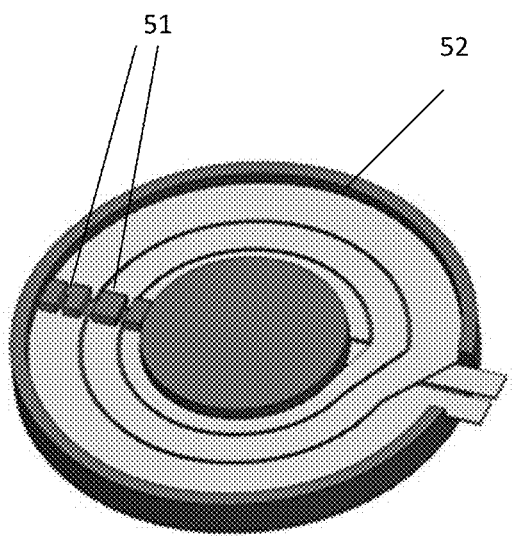
FIG. 5A shows an example of a coil in which each turn of the conductive spiral trace has a capacitor connected in series with the trace, positioned at one circumferential position.
Figure 5B:
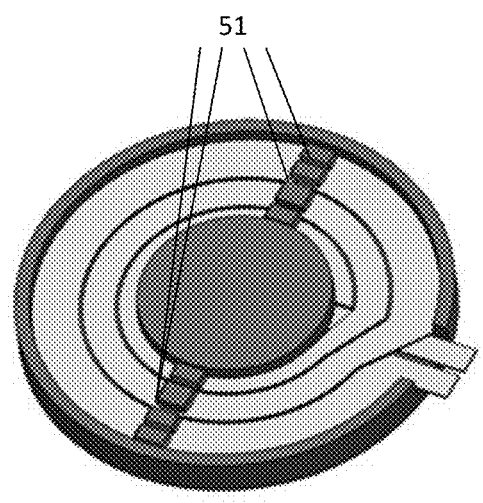
FIG. 5B shows an example where the conductive spiral trace is broken into additional segments and includes series capacitors positioned at two circumferential positions.

In some embodiments, one or more of the conductive spiral traces may be divided into segments with a capacitor connected in series between the segments. FIG. 5A shows an example in which each turn of the conductive spiral trace has at least one capacitor 51 connected in series with the trace, positioned at one circumferential position. FIG. 5B shows an example where the conductive spiral trace is divided into additional segments and includes series capacitors 51 positioned at two circumferential positions.

One or more of the series capacitors may be a standalone capacitor. Standalone capacitors may be formed by any of a variety of devices. Standalone capacitors are devices with dominant capacitive (negative reactive) impedance at the desired frequency of operation; they may have inductive (positive reactive) impedance less than the capacitive impedance at the frequency of operation, and optionally less than 20% of the capacitive impedance at the frequency of operation. In some embodiments, the one or more standalone capacitors are discrete capacitors. The standalone capacitor(s) may have individual packaging which can be galvanically connected to electrical conductors (e.g., by soldering). The standalone capacitor(s) may include, but are not limited to one or more of ceramic capacitors, film capacitors, mica capacitors, PTFE capacitors, tantalum capacitors, tantalum-polymer capacitors, thin film capacitors, electric double layer capacitors, polymer capacitors, electrolytic capacitors, niobium oxide capacitors, silicon capacitors, variable capacitors, and any combination, network or array of devices. The capacitance of the standalone capacitors can be chosen for a desired magnitude of current to flow through each current path, which mitigates the skin effect and the proximity effect, resulting in a high-performance (high-Q) electrical structure.

Although the examples of FIG. 5A and FIG. 5B show that the conductive spiral traces have different widths at different circumferential positions, in other embodiments the width of a trace may not vary at different circumferential positions. Additionally, although a magnetic core 52 is shown in FIG. 5A and FIG. 5B, other embodiments do not include a magnetic core.

Figure 6A:
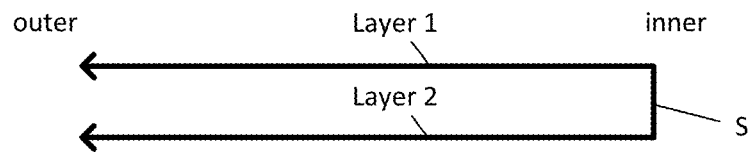
FIG. 6A shows an example in which a connection between layers is made by a shorting conductor at the inner diameter of the spiral traces.
Figure 6B:
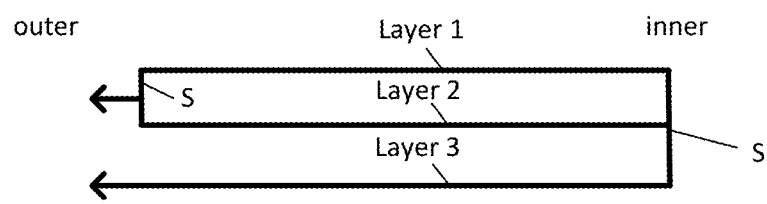
FIG. 6B shows an example with three layers, with a connection between all three layers being made by shorting conductor at the inner diameter of the spiral traces.
Figure 6C:
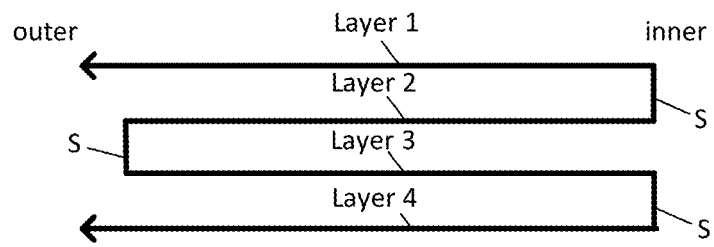
FIG. 6C shows an example with four layers, with a connection between the first and second layers, and between the third and fourth layers, being made at the inner dimeter.

Connections between traces in different layers may be made by shorting conductors S located at the inner diameter or the outer diameter of the spiral traces, or in another location. In some embodiments, the shorting conductors S may be located within the inner diameter of the spiral traces and leads may extend outward from the outer diameter of the spiral traces. FIG. 6A shows an example with two layers, with a connection between layers being made by shorting conductor S at the inner diameter of the spiral traces, and leads (identified by arrows) extending outward from the outer diameter of the spiral traces. FIG. 6B shows an example with three layers, with a connection between all three layers being made by shorting conductor S at the inner diameter of the spiral traces, a connection between Layer 1 and Layer 2 being made by a shorting conductor S at the outer diameter of the spiral traces, and leads extending outward from the outer diameter of the spiral traces. FIG. 6C shows an example with four layers, with a connection between the first and second layers, and between the third and fourth layers, being made at the inner dimeter, a connection between the second and third layers being made at the outer diameter, and leads extending outward from the outer diameter.

Figure 7:
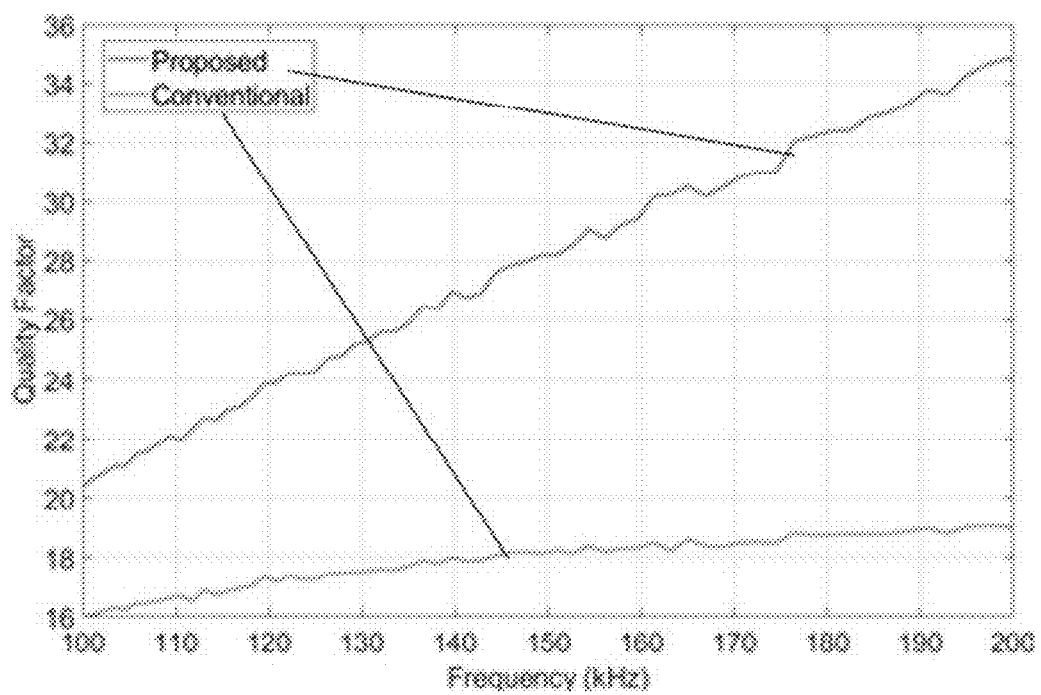
FIG. 7 shows experimental results illustrating the improved Q provided by the techniques described herein.

FIG. 7 shows experimental results illustrating the improved Q provided by the techniques described herein.

The curve labeled "proposed" shows the Q measured for a coil formed on a flexible magnetic core sheet with 100 um thickness and 51 mm diameter. The coil is formed in a 2 layer PCB with 2 oz copper for each layer. Each of the two layers includes two nested spirals, each with a 23 mm inner diameter, 50 mm outer diameter. Each of the spirals has 11 turns and a 425 um width. All four traces are connected in parallel.

The curve labeled "conventional" shows the Q measured for a coil with 14 turns, with 14 mm inner diameter, 42 mm outer diameter, 125 um thick copper, having approximately 1 mm wide traces, on a flexible magnetic core in an area of about 50 mm×50 mm.

As can be seen, the curve labeled "proposed," corresponding to an embodiment of the structures and techniques described herein, has a higher Q for all frequencies tested. The reduction in Q is more pronounced at higher frequencies.

Figure 8:
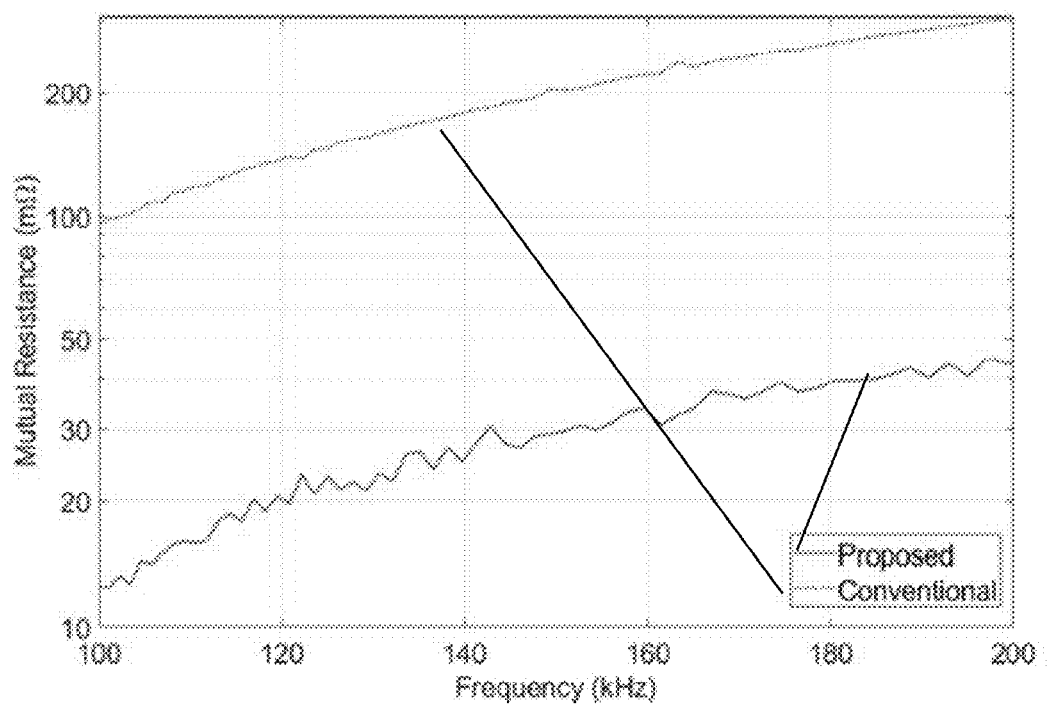
FIG. 8 shows experimental data illustrating the mutual resistance for the same designs vs. frequency.

FIG. 8 shows experimental data illustrating the mutual resistance for the same designs vs. frequency. Mutual resistance is the eddy current loss in one coil (e.g., transmit or receive coil) due to current flowing in another coil (e.g., receive or transmit coil). As can be seen, the mutual resistance for the design labeled "proposed" has a much lower mutual resistance, demonstrating significant reduction in resistive losses due to eddy currents.

Figure 9:
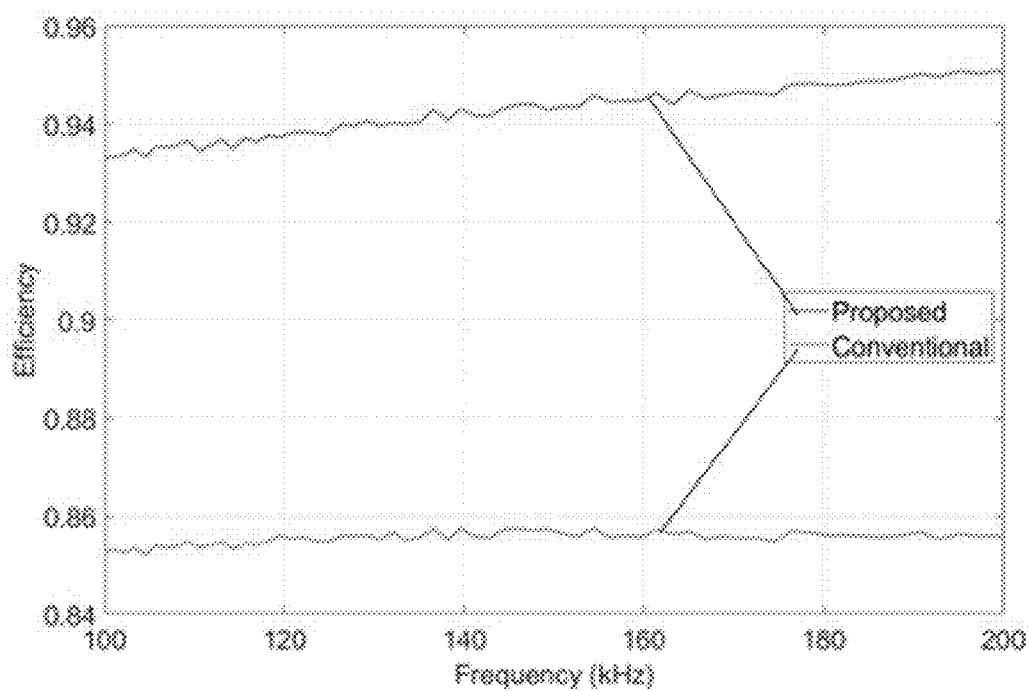
FIG. 9 shows a plot illustrating an improvement in efficiency provided by nested conductive spiral traces.

The improvement in efficiency is also illustrated in the experimental data shown in FIG. 9, which illustrates the design labeled "proposed" has a much higher efficiency than the design labeled "conventional."

Figure 10A:
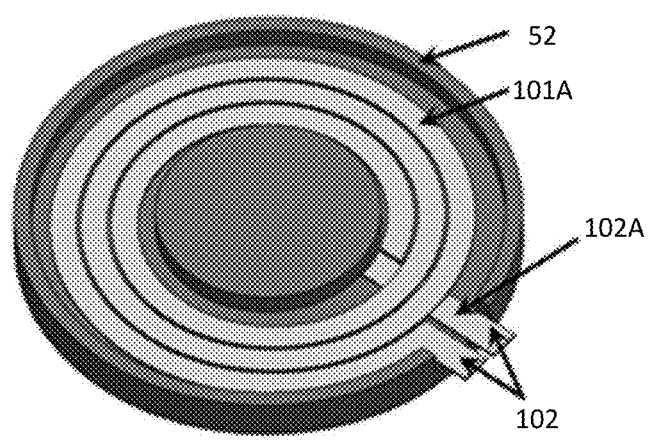
FIG. 10A shows a coil having a conductive spiral trace on a magnetic core.
Figure 10B:
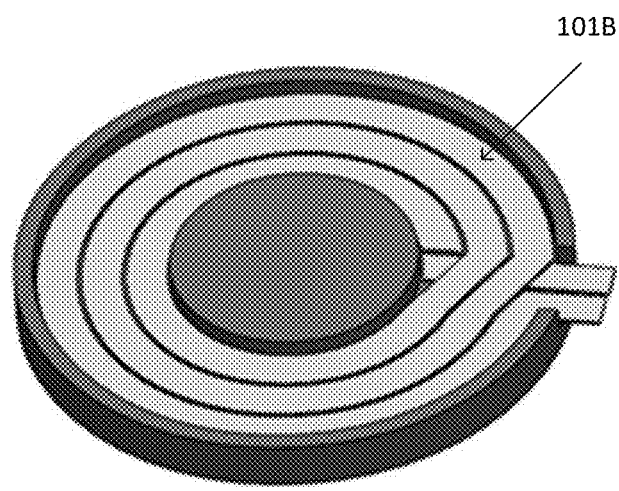
FIG. 10B shows an example of a coil having a conductive spiral trace having a first radius for one turn, a transition to a second radius, and then a second radius for a second turn, a transition to a third radius, and then a third radius for a third turn.

As used herein, the term "spiral" in reference to a trace refers to a trace having two or more turns of different average radii, where at least one turn surrounds one or more other turns. A "spiral," as the term is used herein, may have a continuously and monotonically varying radius along its circumference, as illustrated in FIG. 10A. FIG. 10A shows a coil having a conductive spiral trace 101A on a magnetic core 52 (e.g., a pot core). The coil has a return lead 102A that extends from the interior of the spiral under the conductive spiral trace, forming one of the two coil leads 102. Alternatively a "spiral" may not have a continuously varying radius. For example, FIG. 10B shows an example of a coil having a conductive spiral trace 101B having a first radius for one turn, a transition to a second radius, and then a second radius for a second turn, a transition to a third radius, and then a third radius for a third turn.

If a magnetic core is included, the magnetic core may be, wholly or partially, made of one or more ferromagnetic materials, which have a relative permeability greater than 1, optionally greater than 10. The ferromagnetic materials may include, but are not limited to, one or more of iron, various steel alloys, cobalt, ferrites including manganese-zinc (MnZn) and/or nickel-zinc (NiZn) ferrites, nano-granular materials such as Co—Zr—O, and powdered core materials made of powders of ferromagnetic materials mixed with organic or inorganic binders. However, the techniques and devices described herein are not limited as to the particular material of the magnetic core. The shape of the magnetic core may be: a sheet, a pot core, a sheet (I core), a sheet with a center post, a sheet with an outer rim, RM core, P core, PH core, PM core, PQ core, E core, EP core, EQ core. However, the techniques and devices described herein are not limited to particular magnetic core shapes.

The term "nested" as it refers to spiral traces covers the configuration where a turn of one spiral trace is between two turns of another spiral trace, both spiral traces being in the same layer. In one such configuration, each turn of one spiral trace is between respective turns of another spiral trace. Any number of spiral traces may be nested.

The conductors or "traces" (e.g., conductive spiral traces) and shorting conductors are electrical conductors which may be made of any electrically conductive material or combination of materials, including but not limited to one or more metals such as silver, copper, aluminum, gold and titanium, and non-metallic materials such as graphite. The electrically conductive material may have an electrical conductivity of higher than 200 kS/m, optionally higher than 1 MS/m. The electrical conductors may have any physical shape including, but not limited to, solid material, wire, magnet wire, stranded wire, litz wire, foil conductors, conductors laminated on a substrate, printed circuit board traces, electrode layers formed in in multilayer ceramic capacitor (MLCC) or low-temperature co-fired ceramic (LTCC) processes, integrated circuit traces, or any combination of them. Foil conductors are electrical conductors in which the size of the conductor orthogonal to the direction of current flow is much smaller (e.g., at least 10 times smaller) than the size of the conductor parallel to the direction of the current flow. One example for foil conductors includes, but is not limited to, a foil layer forming a flat current spiral.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "substantially," "approximately," "about" and the like refer to a parameter being within 10%, optionally less than 5% of its stated value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A wireless power transfer coil circuit, comprising:
two or more current paths including a first current path having a first conductive spiral trace and a second current path having a second conductive spiral trace nested with the first conductive spiral trace,
wherein the first current path further comprises a first passive component in series with the first conductive spiral trace and the second current path further comprises a second passive component in series with the second conductive spiral trace; and
wherein an impedance of the first passive component and an impedance of the second passive component have values capable of equalizing current flow in the first and second current paths.

2. The wireless power transfer coil circuit of claim 1, wherein the first and second conductive spiral traces are formed in a same layer.

3. The wireless power transfer coil circuit of claim 2, wherein the layer is planar.

4. The wireless power transfer coil circuit of claim 1, wherein the first and second current paths are connected in parallel.

5. The wireless power transfer coil circuit of claim 1, wherein the first passive component comprises a first capacitor and the second passive component comprises a second capacitor.

6. The wireless power transfer coil circuit of claim 1, wherein the first passive component comprises a first resistor and the second passive component comprises a second resistor.

7. The wireless power transfer coil circuit of claim 6, wherein the first passive component comprises a first capacitor and the second passive component comprises a second capacitor.

8. The wireless power transfer coil circuit of claim 1, wherein the first current path and the second current path comprise respective resistances selected to equalize current flow in the first and second current paths.

9. The wireless power transfer coil circuit of claim 8, wherein the respective resistances are resistances of the respective first and second conductive spiral traces and/or resistances of resistors in series with the respective first and second conductive spiral traces.

10. The wireless power transfer coil circuit of claim 1, further comprising a third conductive spiral trace nested with the first and second conductive spiral traces and in a same layer as the first and second conductive spiral traces.

11. The wireless power transfer coil circuit of claim 1, wherein the first conductive spiral trace comprises a first segment and a second segment, and the first current path further comprises a capacitor connected in series between the first segment and the second segment.

12. The wireless power transfer coil circuit of claim 1, wherein a width of the first conductive spiral trace is less than three times a skin depth at a frequency of operation or a minimum frequency of operation.

13. A wireless power transfer coil circuit, comprising:
two or more current paths including a first current path having a first conductive spiral trace and a second current path having a second conductive spiral trace nested with the first conductive spiral trace;
a third conductive spiral trace; and
a fourth conductive spiral trace nested with the third conductive spiral trace, wherein the first and second conductive spiral traces are in a first layer and the third and fourth conductive spiral traces are in a second layer different from the first layer,
wherein the first conductive spiral trace is nested within the second conductive spiral trace, the third conductive spiral trace is nested within the fourth conductive spiral trace, and the first conductive spiral trace is connected in series with the fourth conductive spiral trace.

14. The wireless power transfer coil circuit of claim 13, wherein the first and second layers are separated by a dielectric layer.

15. The wireless power transfer coil circuit of claim 13, wherein two or more of the first, second, third and fourth conductive spiral traces are connected in parallel.

16. The wireless power transfer coil circuit of claim 13, further comprising at least one conductive connection between the first and second layers within an inner diameter of the wireless power transfer coil circuit.

17. The wireless power transfer coil circuit of claim 13, further comprising a plurality of leads extending from the first and second layers from an outer diameter of the wireless power transfer coil circuit.

18. A wireless power transfer coil circuit, comprising:
two or more current paths including a first current path having a first conductive spiral trace and a second current path having a second conductive spiral trace nested with the first conductive spiral trace,
wherein the first current path further comprises a first passive component in series with the first conductive spiral trace and the second current path further comprises a second passive component in series with the second conductive spiral trace, and
wherein the first and second current paths are connected in parallel and wherein the first passive component comprises a first capacitor and the second passive component comprises a second capacitor and wherein an impedance of the first passive component and an impedance of the second passive component have values capable of equalizing current flow in the first and second current paths.

* * * * *